US012651007B1

(12) United States Patent
Girouard

(10) Patent No.: US 12,651,007 B1
(45) Date of Patent: Jun. 9, 2026

(54) APPARATUS AND METHOD FOR DETERMINING DYNAMIC DATA

(71) Applicant: Capital Asset Management Group, Inc., Washington, DC (US)

(72) Inventor: John Edward Girouard, Washington, DC (US)

(73) Assignee: Capital Asset Management Group, Inc., Washington, DC (US)

( * ) Notice: Subject to any disclaimer, the term of this patent is extended or adjusted under 35 U.S.C. 154(b) by 0 days.

(21) Appl. No.: 19/282,799

(22) Filed: Jul. 28, 2025

(51) Int. Cl.
*G06F 16/28* (2019.01)
*H04L 51/02* (2022.01)

(52) U.S. Cl.
CPC ............ *G06F 16/285* (2019.01); *H04L 51/02* (2013.01)

(58) Field of Classification Search
None
See application file for complete search history.

(56) References Cited

U.S. PATENT DOCUMENTS

| 7,941,296 | B2 * | 5/2011 | Fluegge | ................. | G06Q 10/06 |
| | | | | | 702/182 |
| 8,676,689 | B1 | 3/2014 | Whelan | | |
| 11,803,793 | B2 | 10/2023 | Katz et al. | | |

| 12,314,294 | B1 * | 5/2025 | Browder | ................. | G06F 16/31 |
| 2011/0106691 | A1 | 5/2011 | Clark et al. | | |
| 2019/0057455 | A1 | 2/2019 | Mozeika | | |
| 2019/0378207 | A1 | 12/2019 | Dibner-Dunlap et al. | | |
| 2025/0014098 | A1 * | 1/2025 | Pandit | ................... | G06Q 40/06 |

OTHER PUBLICATIONS

C. Jackson and R. Dame Augmenting cash flow forecasting with machine learning "ION group.com blogNov. 27, 2023".
R. Lenglet Predictive analytics: The future of cash flow prediction "AGICAP websiteJul. 22, 2023".
R Johnson The Impact of AI on Cash Flow Management: 7 Key Insights "Invensis websiteDec. 5, 2024".

* cited by examiner

*Primary Examiner* — Amresh Singh
(74) *Attorney, Agent, or Firm* — CALDWELL LLC

(57) ABSTRACT

An apparatus and method for determining dynamic data. The apparatus includes at least a processor and a memory communicatively connected to the at least a processor. The memory instructs the processor to receive a plurality of input data associated with a user, wherein the input data comprises sequestered data and non-sequestered data, generate, using a classifier, categorized data as a function of the plurality of input data, wherein the categorized data comprises inflow data and outflow data, the classifier further configured to determine an inflow pattern of the inflow data and an outflow pattern of the outflow data, identify, using an evaluation model, at least a status indicator as a function of the inflow data and the outflow data, determine dynamic data as a function of the categorized data and the at least a status indicator, and display, using a downstream device, the dynamic data.

20 Claims, 9 Drawing Sheets

200

202
204
216
206
210
208
214
214
212
206

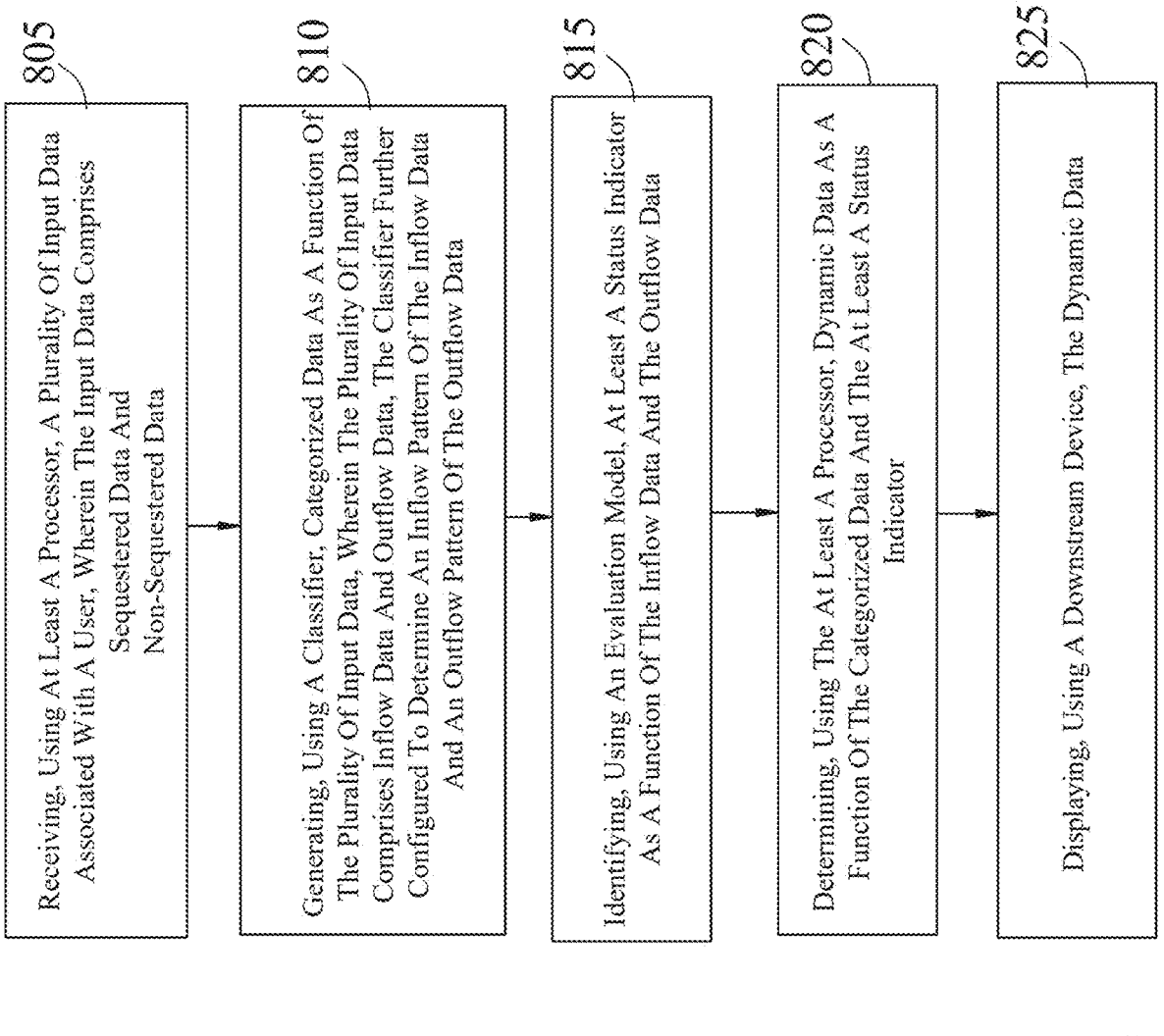

805

Receiving, Using At Least A Processor, A Plurality Of Input Data Associated With A User, Wherein The Input Data Comprises Sequestered Data And Non-Sequestered Data

810

Generating, Using A Classifier, Categorized Data As A Function Of The Plurality Of Input Data, Wherein The Plurality Of Input Data Comprises Inflow Data And Outflow Data, The Classifier Further Configured To Determine An Inflow Pattern Of The Inflow Data And An Outflow Pattern Of The Outflow Data

815

Identifying, Using An Evaluation Model, At Least A Status Indicator As A Function Of The Inflow Data And The Outflow Data

820

Determining, Using The At Least A Processor, Dynamic Data As A Function Of The Categorized Data And The At Least A Status Indicator

825

Displaying, Using A Downstream Device, The Dynamic Data

APPARATUS AND METHOD FOR DETERMINING DYNAMIC DATA

FIELD OF THE INVENTION

The present invention generally relates to the field of large data management. In particular, the present invention is directed to an apparatus and a method for determining dynamic data.

BACKGROUND

Modern data processing systems face challenges in integrating and analyzing diverse datasets, including sequestered and non-sequestered data from various sources. Transforming unstructured data into structured formats for analysis remains difficult, as does accurately modeling inflow and outflow patterns to derive meaningful indicators. Securely accessing sensitive data from external repositories while ensuring compliance adds complexity. Additionally, existing methods often fail to iteratively train models on historical data for reliable projections or to identify gaps against predefined targets.

SUMMARY OF THE DISCLOSURE

In an aspect, an apparatus for determining dynamic data includes at least a processor and a memory communicatively connected to the at least a processor. The memory contains instructions configuring the processor to receive a plurality of input data associated with a user, wherein the input data comprises sequestered data and non-sequestered data, generate, using a classifier, categorized data as a function of the plurality of input data, wherein the categorized data comprises inflow data and outflow data, the classifier further configured to determine an inflow pattern of the inflow data and an outflow pattern of the outflow data, identify, using an evaluation model, at least a status indicator as a function of the inflow data and the outflow data, determine, using the at least a processor, dynamic data as a function of the categorized data and the at least a status indicator, and display, using a downstream device, the dynamic data.

In another aspect, a method for determining dynamic data includes receiving, using at least a processor, a plurality of input data associated with a user, wherein the input data comprises sequestered data and non-sequestered data, generating, using a classifier, categorized data as a function of the plurality of input data, wherein the categorized data comprises inflow data and outflow data, the classifier further configured to determine an inflow pattern of the inflow data and an outflow pattern of the outflow data, identifying, using an evaluation model, at least a status indicator as a function of the inflow data and the outflow data, determining, using the at least a processor, dynamic data as a function of the categorized data and the at least a status indicator, and displaying, using a downstream device, the dynamic data.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 8 is a block diagram of an exemplary method for determining dynamic data.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for determining dynamic data. The apparatus includes at least a computing device comprised of a processor and a memory communicatively connected to the processor. The memory instructs the processor to receive, using the at least a processor, a plurality of input data associated with a user, wherein the input data comprises sequestered data and non-sequestered data. The processor generates, using a classifier, categorized data as a function of the plurality of input data, wherein the categorized data comprises inflow data and outflow data, the classifier further configured to determine an inflow pattern of the inflow data and an outflow pattern of the outflow data. The processor identifies, using an evaluation model, at least a status indicator as a function of the inflow data and the outflow data. Additionally, the at least a processor determines dynamic data as a function of the categorized data and the at least a status indicator. The processor displays, using a downstream device, the dynamic data.

Figure 1:
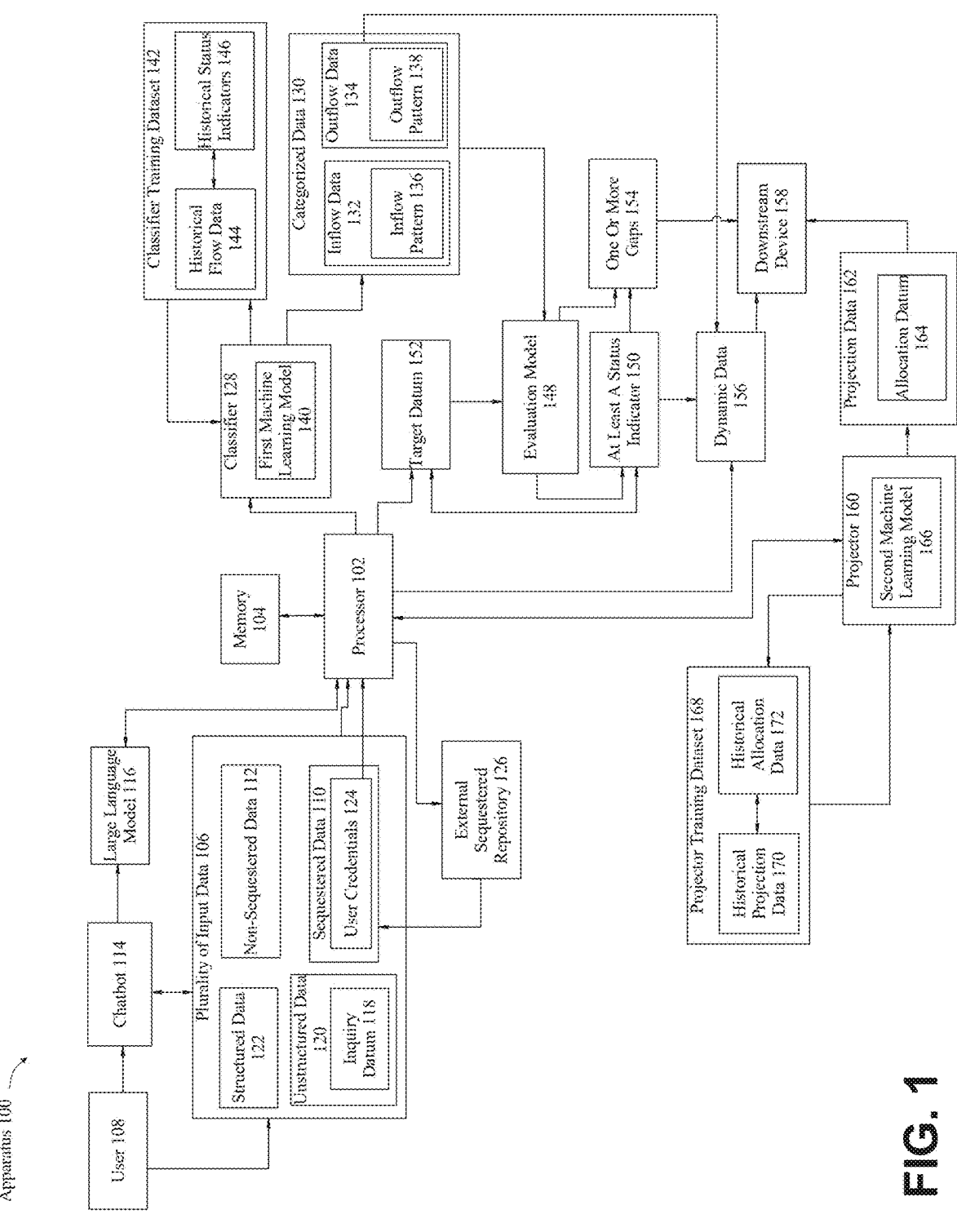
FIG. 1 is a block diagram of an apparatus for determining dynamic data.

Referring now to FIG. 1, an exemplary embodiment of apparatus 100 for determining dynamic data is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 102 is configured to receive a plurality of input data 106 associated with a user 108, wherein the input data includes sequestered data 110 and non-sequestered data 112. As used in this disclosure, "input data" is information, signals, or datasets provided to a system, device, or process for analysis, processing, or utilization. Input data may include, without limitation, numerical values, textual information, audio signals, visual representations, sensory measurements, or other forms of data derived from physical, digital, or computational sources. In an embodiment, input data may originate from user interactions, sensors, databases, networks, and/or other input mechanisms, and may be structured, unstructured, raw, or pre-processed depending on the context of the application. As used in this disclosure, a "user" is an individual, entity, or system that interacts with, operates, or utilizes a device, system, application, or process described herein. Without limitation, the user 108 may engage with the apparatus 100 directly, such as through a graphical interface or hardware component, or indirectly, such as by providing input, instructions, or feedback. In a non-limiting example, the user 108 may include an operator, administrator, customer, end-user, or automated system configured to interact with the described embodiments. As used in this disclosure, "sequestered data" is information that is isolated, restricted, or segregated within a system or environment to ensure limited access, enhanced security, or specialized processing. Sequestered data 110 may be stored or maintained separately from other datasets to protect its integrity, prevent unauthorized access, or enable its use in specific operations without interference. In a non-limiting example, sequestered data 110 may include encrypted information, confidential records, or subsets of data flagged for controlled access or secure processing. As used in this disclosure, "non-sequestered data" is information that is not isolated or restricted and is freely accessible or integrated within a system or environment. Non-sequestered data 112 may be available for general use, analysis, or sharing across various components or users without the constraints of specialized security measures or segregation. In a non-limiting example, non-sequestered data 112 may include public datasets, shared resources, or information utilized in open or collaborative processing systems.

With continued reference to FIG. 1, an API may be used to retrieve input data 106, such as a user's banking statements, with verification to ensure accuracy and security. As used in this disclosure, an "API" (Application Programming Interface) is a set of protocols, routines, and tools that allow different software applications to communicate and interact. Without limitation, the API may facilitate seamless data exchange between a user's banking system and the financial analysis platform. Verification methods, such as multi-factor authentication or secure tokens, may be employed to authenticate the user 108 and protect sensitive financial information. Once the API retrieves the input data 106, Natural Language Processing (NLP) may be used to parse and categorize the input data 106 effectively. Without limitation, using the NLP, the financial data returned via the API may be processed to identify patterns and classify transactions. The unstructured text in transaction descriptions may be parsed using techniques such as tokenization, stemming, and removal of unnecessary words. Categorization may be achieved through machine learning models or rule-based systems, which analyze keywords and phrases in transaction descriptions to classify spending or income. For instance, NLP might identify "Starbucks Coffee" as dining or "ABC Utility Co." as utilities. Contextual analysis, such as recognizing merchant names or transaction sentiment, may also enhance classification. This parsed data may then be mapped to financial categories like income, discretionary spending, or net worth-building transactions. The categorization process may be iterative, incorporating user feedback to refine the model and improve accuracy over time. To ensure privacy, sensitive data may be processed in sequestered environments, such as virtual machines, where it remains isolated from broader systems.

With continued reference to FIG. 1, apparatus 100 may further include The apparatus 100 of claim 1, further comprising a chatbot 114 communicatively connected to the at least a processor 102 and a large language model 116, wherein the chatbot 114 is configured to respond to an inquiry datum 118 and wherein the large language model 116 is configured to receive the plurality of input data 106 and process the plurality of input data 106 from unstructured data 120 to structured data 122. Without limitation, the chatbot 114 may be further described in FIG. 6. A "large language model," as used herein, is a deep learning data structure that can recognize, summarize, translate, predict and/or generate text and other content based on knowledge gained from massive datasets. Large language models may be trained on large sets of data. Training sets may be drawn from diverse sets of data such as, as non-limiting examples, novels, blog posts, articles, emails, unstructured data 120, electronic records, and the like. In some embodiments, training sets may include a variety of subject matters, such as, nonlimiting examples, financial transactions, bank statements, electronic financial records, tax filings, budgeting spreadsheets, user communications, and other structured or unstructured data 120 formats, and the like. In some embodiments, training sets of an LLM may include information from one or more public or private databases. As a non-limiting example, training sets may include databases associated with an entity. In some embodiments, training sets may include portions of documents associated with the electronic records correlated to examples of outputs. In an embodiment, an LLM may include one or more architectures based on capability requirements of an LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on the capability needed such as generative, contextual, or other specific capabilities.

With continued reference to FIG. 1, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database. As a non-limiting example, specific training set may include text related to the users 108 such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction based algorithm configured to receive an article and apply a probability distribution to the words already typed in a sentence to work out the most likely word to come next in augmented articles. For example, if some words that have already been typed are "What is my financial goals for", then it may be highly likely that the word "next month" will come next. An LLM may output such predictions by ranking words by likelihood or a prompt parameter. For the example given above, an LLM may score "you" as the most likely, "your" as the next most likely, "his" or "her" next, and the like. An LLM may include an encoder component and a decoder component.

With continued reference to FIG. 1, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

With continued reference to FIG. 1, attention mechanism may include, without limitation, generalized attention self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input, to other words. As a non-limiting example, an LLM may learn to associate the word "you", with "how" and "are". It is also possible that an LLM learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 1, transformer architecture may include a decoder. Decoder may be a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

With continued reference to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

With continued reference to FIG. 1, decoder may take this output and add it to the decoder inputs. Decoder may continue decoding until a token is predicted. Decoder may stop decoding once it predicts an end token.

With continued reference to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data 120. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. In some embodiments, input may include any set of data associated with the plurality of input data 106.

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data 120. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

With continued reference to FIG. 1, wherein the plurality of input data 106 may include user credentials 124 associated with an external sequestered repository 126. As used in this disclosure, "user credentials" are data, information, or identifiers that may be used to verify the identity or access privileges of a user within a system, application, or device. User credentials 124 may include, but are not limited to, usernames, passwords, biometric data (such as fingerprints, facial recognition, or retinal scans), cryptographic keys, security tokens, multi-factor authentication codes, digital certificates, or any other mechanism by which a user can authenticate their identity or gain authorized access to specific resources. As used in this disclosure, an "external sequestered repository" is a secure and isolated storage location that is external to a primary system, application, or device. Without limitation, the external sequestered repository 126 may be designed to store data, files, or other resources in a manner that prevents direct access or modification by unauthorized users or systems. Continuing, the external sequestered repository 126 may include, but is not limited to, cloud-based storage systems, remote servers, or dedicated hardware devices configured to maintain data integrity and confidentiality. In a non-limiting example, the external sequestered repository 126 may leverage encryption, access controls, or other security protocols to ensure the stored data remains protected and segregated from the primary operational environment. In a non-limiting example, the external sequestered repository 126 may include a bank's secure data vault or a financial institution's system for storing sensitive customer information. For instance, without limitation, a bank may maintain an external repository to securely store account details, transaction histories, and personal identification data separate from its operational systems, ensuring an additional layer of protection against unauthorized access or cyberattacks.

With continued reference to FIG. 1, wherein the at least a processor 102 may be configured to access, using the user credentials 124, the external sequestered repository 126 and retrieve, from the external sequestered repository 126, the sequestered data 110. In a non-limiting example, the external sequestered repository 126 may represent a bank's secure database where sensitive customer financial information, such as account balances, transaction histories, or credit scores, is stored. Without limitation, using the user credentials 124, such as a username, password, or biometric authentication, the processor 102 may access the external sequestered repository 126 to retrieve specific data. For instance, without limitation, the processor 102 may retrieve the user's transaction history to analyze spending patterns and provide personalized financial insights as described herein. In another non-limiting example, the external sequestered repository 126 may be a secure cloud storage system utilized by an investment firm to store portfolio details and performance analytics. Continuing, the processor 102 may use user credentials 124 to securely access the external sequestered repository 126 and retrieve data on the user's asset allocations, gains, or losses. Without limitation, this information may then be processed to generate investment reports or suggest portfolio adjustments. In another non-limiting example, the external sequestered repository 126 may be a payment gateway storing encrypted payment data, such as saved credit card information. Continuing, the processor 102 may retrieve the data, using the user credentials 124, to facilitate a secure and seamless transaction when a user initiates a purchase.

Still referring to FIG. 1, processor 102 is configured to generate, using a classifier 128, categorized data 130 as a function of the plurality of input data 106, wherein the categorized data 130 includes inflow data 132 and outflow data 134, the classifier 128 further configured to determine an inflow pattern 136 of the inflow data 132 and an outflow pattern 138 of the outflow data 134. As used in this disclosure, "categorized data" is data that has been organized or grouped into specific classes, labels, or categories based on shared attributes, characteristics, or predefined criteria. Categorized data 130 may include, but is not limited to, structured data 122 sets where individual data points are assigned to one or more classifications for ease of analysis, retrieval, or processing. Without limitation, the categorization may be applied manually, automatically, or through machine learning techniques, depending on the context and requirements. As used in this disclosure, "inflow data" is data representing the incoming movement of resources, assets, or values into a system, entity, or process over a defined period. Inflow data 132 may include, but is not limited to, records of financial income, such as salary payments, investment dividends, sales revenue, or other monetary deposits. As used in this disclosure, "outflow data" is data representing the outgoing movement of resources, assets, or values from a system, entity, or process over a defined period. Outflow data 134 may include, but is not limited to, records of expenditures, such as payments for goods or services, operational costs, loan repayments, or investment contributions. Without limitation, both the inflow data 132 and the outflow data 134 may be utilized by the apparatus 100 to analyze spending patterns, forecast resource needs, or optimize operational efficiency within the system. As used in this disclosure, an "inflow pattern" is a recurring or identifiable trend in the incoming movement of resources, assets, or values over a specified period. Inflow patterns 136 may include, but are not limited to, periodic income deposits, such as biweekly salary payments, monthly rental income, or quarterly dividend payments. Without limitation, inflow patterns may be characterized by timing, frequency, or magnitude, and may serve as a basis for analyzing cash flow trends, forecasting future inflows, or identifying deviations from expected income behavior. As used in this disclosure, an "outflow pattern" is a recurring or identifiable trend in the outgoing movement of resources, assets, or values over a specified period. Outflow patterns 138 may include, but are not limited to, recurring expenses such as monthly mortgage payments, utility bills, or discretionary spending on dining and entertainment. Outflow patterns 138 may be characterized by timing, frequency, or magnitude and may be used to analyze spending habits, forecast future outflows, or identify areas for optimizing resource allocation.

With continued reference to FIG. 1, in an embodiment, the apparatus may use statistical pattern recognition algorithms to determine inflow data 132 and outflow data 134. As used in this disclosure, "statistical pattern recognition" is a method that involves analyzing data using statistical models. This approach may involve techniques such as Bayesian networks or linear discriminant analysis to determine the likelihood that a given data point belongs to a particular category. For instance, statistical models may predict whether a transaction is an inflow (e.g., salary deposit) or an outflow (e.g., rent payment) based on historical trends and associated probabilities. Without limitation, statistical pattern recognition algorithms may use probabilistic models to analyze data, potentially calculating the likelihood of a transaction falling into specific categories like income, discretionary spending, or net worth-building. Continuing, this approach may allow the model to make predictions even with incomplete or noisy data, improving the reliability of transaction classifications. For instance, recurring deposits from an employer might be categorized as inflows, while monthly rent payments could be classified as outflows based on statistical trends. In another non-limiting example, the apparatus may use structural pattern recognition algorithms to determine inflow data 132 and outflow data 134. As used in this disclosure, "structural pattern recognition" is a method that focuses on identifying patterns by analyzing the relationships, structures, or hierarchies within data. This method may represent data as structured elements, such as graphs or trees, to capture recurring patterns, such as monthly subscriptions or loan repayments. Structural pattern recognition may help in classifying transactions with predictable relationships, such as periodic inflows like dividends or recurring outflows like utility bills. Without limitation, structural pattern recognition algorithms may focus on relationships and hierarchies within transaction data, making them suitable for identifying recurring patterns. Without limitation, the structural pattern algorithms may detect inflow patterns like bi-weekly paychecks or periodic dividend deposits and outflow patterns like recurring bills or subscriptions, differentiating them from one-time expenditures. In another non-limiting example, the apparatus may use neural networks to determine inflow data 132 and outflow data 134. As used in this disclosure, a "neural network" is a machine learning algorithm modeled after the human brain that uses interconnected layers of nodes (neurons) to analyze complex, nonlinear relationships within data. Neural networks may identify patterns that are difficult to detect using simpler methods, such as subtle spending trends or irregular income sources. For example, they may distinguish between infrequent high-value inflows, such as tax refunds, and regular income like paychecks. In another non-limiting example, the apparatus may use template matching algorithms to determine inflow data 132 and outflow data 134. As used in this disclosure, "template matching" is a pattern recognition method that involves comparing data points to predefined templates or reference patterns. Without limitation, this method may identify transactions that closely match a known template, such as salary deposits or specific merchant codes associated with dining. Template matching may streamline the categorization process by quickly associating transactions with familiar patterns. In another non-limiting example, the apparatus may use clustering algorithms to determine inflow data 132 and outflow data 134. As used in this disclosure, "clustering algorithms" are methods that group data points based on shared attributes without requiring predefined categories. These algorithms may include methods like k-means or hierarchical clustering, which identify clusters of similar transactions. For example, they may group utility bills and groceries into essential outflows, separating them from discretionary expenses like dining or entertainment. In another non-limiting example, the apparatus may use a hybrid approach to determine inflow data 132 and outflow data 134. As used in this disclosure, a "hybrid approach" is a method that combines two or more pattern recognition techniques to improve accuracy and adaptability. For instance, a hybrid model may integrate neural networks for detecting nonlinear relationships with statistical models for fine-tuning probabilities. Such approaches may provide robust results by leveraging the strengths of multiple algorithms to address complex financial data patterns.

With continued reference to FIG. 1, in an embodiment, the classifier 128 may identify and organize financial transactions of the plurality of input data 106 into distinct groups, such as "lifestyle expenses" and "net worth-building cash flows." Lifestyle expenses may include non-recoverable expenditures that support daily living and comfort but do not directly contribute to building financial equity. For instance, without limitation, transactions like grocery purchases, dining out, entertainment subscriptions, and travel costs may fall under this category. In another non-limiting example. The lifestyle expenses may include recurring and essential expenses for maintaining a certain quality of life but do not increase an individual's financial net worth. Additionally and or alternatively, the classifier 128 may classify discretionary expenses that enhance personal satisfaction or convenience but are not necessities as "lifestyle expenses." For example, without limitation, lifestyle expenses may also include spa treatments, high-end apparel purchases, or premium streaming services. Continuing, while these transactions may provide value and enjoyment, they may not contribute to asset accumulation or long-term financial growth. Conversely, "net worth-building" cash flows may include transactions that represent investments or payments that directly contribute to increasing financial equity. For example, without limitation, mortgage payments allocated toward the principal balance, contributions to a 401(k) or IRA, and stock or bond purchases may all be categorized as net worth-building. Continuing, the net worth-building expenditures may reflect a proactive approach to financial growth and security, helping individuals grow their wealth over time. In another non-limiting example, the classifier 128 may further categorize payments for education or skill development as net worth-building, depending on their context. For instance, without limitation, the tuition payments for a professional certification course that enhances earning potential may be classified under this category. Similarly, without limitation, funding a small business or purchasing real estate properties intended for rental income may fall under net worth-building cash flows. Without limitation, these types of transactions may represent strategic financial decisions that aim to yield long-term benefits. The classifier 128 may provide users with actionable insights to optimize their cash flow. Without limitation, the classifier 128 may utilize the inflow pattern 136 and the outflow pattern 138 to categorize the plurality of input data 106. Without limitation, the classifier 128 may, using inflow patterns 136 and outflow patterns 138, categorize transactions into actionable classifications, such as "net worth-building" or "non-essential spending." For example, without limitation, inflow patterns 136 may identify recurring salary deposits, allowing users to better understand their steady income streams. Outflow patterns 138 might distinguish between routine expenses and strategic expenditures, such as paying down a mortgage or contributing to an IRA, which are categorized as net worth-building because they contribute to financial equity and long-term wealth. Continuing, this functionality may allow the classifier 128 to provide users with insights into how their money is being allocated and identify opportunities for financial optimization. For instance, it may suggest reallocating funds from non-essential outflows to net worth-building activities, like increasing retirement contributions or paying down high-interest debt, based on patterns identified in the input data 106. The system effectively transforms raw financial data into strategic recommendations, enabling users to make informed decisions about their cash flow to enhance financial stability and growth.

With continued reference to FIG. 1, wherein the classifier 128 may include a first machine learning model 140, wherein the first machine learning model 140 is iteratively trained on classifier training dataset 142, wherein the classifier training dataset 142 comprises historical flow data 144 corresponding to historical status indicators 146. As used in this disclosure, a "classifier training dataset" is a collection of data utilized to iteratively train the second machine learning model 166. Without limitation, the classifier training dataset 142 may include labeled examples or historical data points, where each data point is associated with one or more predefined categories. As used in this disclosure, "historical flow data" is data representing patterns, sequences, or records of transactions, events, or operations that occurred over a specified period in the past. Without limitation, historical flow data 144 may include, but is not limited to, time-series data reflecting the movement or allocation of resources, such as financial transactions. For instance, without limitation, the historical flow data 144 may include details of cash inflows and outflows, categorized expenditures, and/or investment returns over previous months or years. For example, the historical flow data 144 may include inflow data 132 and outflow data 134 as described herein. Without limitation, historical flow data 144 may be used to identify trends, correlations, or anomalies that inform predictive or analytical models. As used in this disclosure, a "historical status indicator" is labels, classifications, or outcomes associated with historical data points that reflect the state, condition, or performance of a system, entity, or process over time. Without limitation, the historical status indicator 146 may include metrics or categorizations such as "positive cash flow," "budget deficit," "operational efficiency," or "growth achieved," depending on the context. Continuing, the historical status indicators 146 may include indicators that may enable trend analysis, pattern recognition, and predictive modeling to assess or guide future decisions or strategies. For example, the historical status indicators 146 may describe the state, condition, or result of the underlying system or process at the time of the corresponding historical flow data 144.

Still referring to FIG. 1, processor 102 is configured to identifying, using an evaluation model 148, at least a status indicator 150 as a function of the inflow data 132 and the outflow data 134. As used in this disclosure, an "evaluation model" is a computational or algorithmic framework designed to analyze and assess data inputs to derive meaningful outcomes or insights. Without limitation, the evaluation model 148 may be designed to process inflow data 132 and outflow data 134 to identify at least a status indicator 150. As used in this disclosure, a "status indicator" is a label, classification, or signal derived from analyzing data inputs, representing the state, condition, or performance of a system, entity, or process. Without limitation, the status indicator may include, but is not limited to, metrics such as "positive cash flow," "deficit," "high risk," or "growth achieved," and the like. Continuing, these indicators may serve as actionable insights or benchmarks, allowing for monitoring, decision-making, or predictive analysis within the apparatus 100. In a non-limiting example, the evaluation model 148 may incorporate mathematical, statistical, or machine learning techniques to evaluate the relationship between the inflow and outflow data 134, enabling the determination of indicators. In a non-limiting example, the evaluation model 148 may be iteratively refined to improve accuracy and adapt to changing data patterns.

With continued reference to FIG. 1, wherein the evaluation model 148 may determine the at least a status indicator 150 by comparing the inflow data 132 and the outflow data 134 to at least a target datum 152. As used in this disclosure, a "target datum" is a predefined value, benchmark, or threshold that serves as a reference point for evaluating or comparing data. Without limitation, the target datum 152 may represent an optimal, acceptable, or desired state or condition within a system. For example, the target datum 152 may include a specific cash flow ratio, budget allocation, or net worth growth rate, against which the inflow data 132 and the outflow data 134 may be assessed. For example, without limitation, the target datum 152 may serve as a benchmark, such as a predefined cash flow threshold, a budgetary limit, an expected savings goal, and the like. In an embodiment, the target datum 152 may be set by the user 108 or the apparatus 100. In a non-limiting example, if the inflow data 132 exceeds the outflow data 134 and meets or surpasses the target datum 152, the evaluation model 148 may classify the status indicator as "positive financial health." Conversely, without limitation, if the outflow data 134 exceeds the inflow data 132 or fails to meet the target datum 152, the evaluation model 148 may determine a status indicator such as "deficit" or "underperformance." The evaluation model 148 may enable precise assessment and classification of financial or operational conditions based on objective benchmarks.

With continued reference to FIG. 1, wherein the evaluation model 148 may identify one or more gaps 154 as a function of the at least a status indicator 150 and the at least a target datum 152. As used in this disclosure, "gaps" are discrepancies, variances, or differences identified between a current state, and a predefined desired state. Without limitation, the one or more gaps 154 may signify areas where performance, conditions, or outcomes deviate from expectations, benchmarks, or goals, and may provide actionable insights for improvement or adjustment. In an embodiment, the evaluation model 148 may assess the difference between actual performance, represented by the status indicator, and desired outcomes, represented by the target datum 152. For example, without limitation, if a financial system's inflow-to-outflow ratio is below the target datum 152, the evaluation model 148 may identify one or more gaps 154 indicating a shortfall in revenue generation or excessive expenditures. Continuing, one or more gaps 154 may provide a quantifiable measure of underperformance, prompting adjustments to meet the defined target. In another non-limiting example, the one or more gaps 154 identified by the evaluation model 148 may represent specific areas for improvement. For instance, without limitation, the one or more gaps 154 may highlight the need to increase revenue streams, reduce non-essential expenses, or restructure debt to align closer with the target datum 152. Without limitation, the evaluation model 148 may categorize these gaps based on severity, frequency, or impact, enabling prioritization for corrective actions. For example, a minor gap in discretionary spending may require less urgent intervention than a significant gap in meeting debt repayment obligations. In a non-limiting example, the evaluation model 148 may enhance decision-making processes by highlighting actionable insights. Continuing, the one or more gaps 154 may serve as indicators for targeted interventions, such as real-locating resources, revising financial strategies, modifying operational processes, and the like. Additionally and or alternatively, the evaluation model 148 and/or the apparatus 100 may track the one or more gaps 154 over time to evaluate the effectiveness of implemented changes and adapt the target datum 152 dynamically to evolving conditions or goals. Continuing, this iterative process may ensure continuous improvement and alignment with desired outcomes.

Still referring to FIG. 1, processor 102 is configured to determine dynamic data 156 as a function of the categorized data 130 and the at least a status indicator 150. As used in this disclosure, "dynamic data" is data that is continuously changing or updated in real-time or near real-time based on inputs, conditions, or computations. In a non-limiting example, the dynamic data 156 may include cash flow. In a non-limiting example, the dynamic data 156 may be determined as a function of categorized data 130 and at least a status indicator 150. Continuing, the dynamic data 156 may provide an up-to-date representation of financial activity, enabling responsive decision-making and analysis. For instance, cash flow as dynamic data 156 may reflect the difference between inflow and outflow data 134, categorized into "lifestyle expenses" and "net worth-building" cash flows, and influenced by the status indicator's evaluation of financial health.

Still referring to FIG. 1, processor 102 is configured to display, using a downstream device 158, the dynamic data 156. As used in this disclosure, "downstream device" is a device that accesses and interacts with apparatus 100. For instance, and without limitation, downstream device 158 may include a remote device and/or apparatus 100. In a non-limiting embodiment, downstream device 158 may be consistent with a computing device as described in the entirety of this disclosure. For example, without limitation, the downstream device 158 may include smartphones, laptops, tablets, desktop computers, or other computing devices capable of running software or applications linked to apparatus 100. Continuing, this configuration may enable users to interact seamlessly with the dynamic data 156 in real-time or near real-time, allowing for convenient and efficient financial management.

With continued reference to FIG. 1, without limitation, the downstream device 158 may include a graphical user interface. A "graphical user interface (GUI)," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user 108 performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Continuing, the graphical user interface may provide a customizable dashboard as a method for users to interact with the dynamic data 156. Without limitation, the dashboard may include sections labeled "Current Cash Flow," "Monthly Trends," "Financial Goals," and the like providing a high-level overview of financial activity. Continuing, the GUI may further utilize intuitive design principles to ensure ease of use, with clear labels and user-friendly navigation options. Continuing, without limitation, to enhance functionality, the GUI may offer user-configurable options, enabling users to customize how data is displayed and analyzed. As used in this disclosure, "user-configurable options" are adjustable settings within the interface that allow users to tailor their experience according to their preferences. For example, without limitation, the users 108 may access drop-down menus to set or modify financial goals such as "Save $10,000 this year," "Reduce discretionary spending by 20%," and the like. Without limitation, the user-configurable options may influence the organization and prioritization of the displayed data, aligning it more closely with the user's specific financial objectives. In another non-limiting example, the GUI may employ color-coded visualizations to improve the clarity and interpretation of data. As used in this disclosure, "color-coded visualizations" is the use of distinct colors to differentiate data categories or highlight key information. For instance, without limitation, the inflow data 132, representing income or positive financial movement, may be displayed in green, while the outflow data 134, representing expenses, may be displayed in red. Additionally and or alternatively, additional visualizations may include arrows or icons to signal trends, such as an upward arrow for increasing cash flow or a warning icon for potential deficits. In another non-limiting example, interactive features within the GUI may allow users to explore the categorized data 130 in greater detail. For example, clicking on a segment of a pie chart labeled "Lifestyle Expenses" may expand a detailed view of transactions, such as dining, entertainment, and subscription services. Similarly, without limitation, selecting "Net Worth-Building Cash Flows" may display details about mortgage payments, retirement contributions, or investment purchases. Without limitation, the GUI may prominently display status indicators derived from the evaluation model 148. Continuing, the status indicators may appear alongside actionable recommendations, such as reducing discretionary spending or increasing investment contributions, offering users practical steps to improve their financial status. In another non-limiting example. users may also configure alerts and notifications through the GUI. As used in this disclosure, "alerts and notifications" are automated messages or signals triggered by predefined conditions. For example, the alerts and notifications may include messages that indicate exceeding a budget limit or achieving a financial milestone. Continuing, the apparatus 100 may send a notification to the downstream device 158 when monthly outflows surpass a user-defined threshold or the target datum 152. Without limitation, these alerts may keep users informed of critical financial events, ensuring timely responses to changes in their financial condition. In another non-limiting example, the GUI may include an interactive calendar view for displaying the dynamic data 156 over time. As used in this disclosure, an "interactive calendar" is a graphical representation of data organized by dates. Without limitation, the interactive calendar may allow users to analyze historical and projected financial activity. Users may select specific time ranges to view summaries of the inflow data 132 and the outflow data 134, as well as comparisons of actual performance versus financial goals or the target datum 152. Without limitation, the interactive calendar feature may provide valuable insights into trends and patterns, helping users anticipate future financial conditions. Without limitation, the additional features may include integration with external accounts or platforms. As used in this disclosure, "external platforms" are third-party services. In a non-limiting example, the external platforms may include banks, credit cards, investment platforms, and the like that store relevant financial data. The GUI may offer a "Connect Accounts" feature that allows users to link these services, enabling the apparatus 100 to retrieve and update dynamic data 156 automatically. Continuing, this integration may provide users with a comprehensive view of their financial activity across multiple sources.

With continued reference to FIG. 1, the at least a processor 102 may be configured to generate projection data 162 using a projector 160 and the evaluation model 148, wherein the projection data 162 comprises at least an allocation datum 164. In some embodiments, processor 102 may be configured to operate projector 160. As used in this disclosure, a "projector" is a module configured to calculate and generate projection data 162. Without limitation, the projector 160 may utilize mathematical models, algorithms, or predictive analytics to estimate future outcomes, trends, or resource allocations. For example, the projector 160 may calculate the projection data 162, which includes at least an allocation datum 164. As used in this disclosure, an "allocation datum" is a specific data point or set of data points representing the distribution, assignment, or allocation of resources, values, or inputs across predefined categories or objectives. Without limitation, the allocation datum 164 may include, but is not limited to, financial budgets, time allocations, personnel assignments, or resource utilization. For instance, without limitation, the allocation datum 164 may be a predicted or calculated value indicating how resources are expected to be distributed based on historical patterns, current trends, strategic goals, and the like. In a non-limiting example, the allocation datum 164 may be determined based on the one or more gaps 154 identified by the evaluation model 148. For instance, without limitation, the evaluation model 148 may identify one or more gaps 154 indicating that the user's discretionary spending on "lifestyle expenses" exceeds their monthly budget by $500. Here, the one or more gaps 154 may represent a shortfall between the current spending pattern (status indicator) and the target datum 152

(budget limit). Continuing, by using this information, the projector 160 may calculate an allocation datum 164 to address the one or more gaps 154. For example, the allocation datum 164 may suggest redistributing resources by reducing discretionary spending by $200 on dining and $300 on entertainment. Continuing, the redistribution aligns the user's financial activity with the budget target, effectively closing the one or more gaps 154. In another non-limiting example, if the evaluation model 148 identifies a gap in investment contributions, such as a $1,000 shortfall in meeting a quarterly savings goal, the projector 160 may calculate an allocation datum 164 to reallocate cash inflow from surplus categories, such as reducing vacation spending or deferring non-essential purchases. The allocation datum 164 in this case may propose allocating $500 from unspent travel funds and $500 from reduced dining expenditures to the investment category. Continuing, the allocation datum 164, derived from the one or more gaps 154, may be displayed via a graphical user interface (GUI) on the downstream device 158, such as a smartphone or laptop. Without limitation, the GUI may show recommended adjustments, along with visual aids such as color-coded charts or highlighted sections, to make the proposed resource reallocation clear and actionable for the user 108. Without limitation, this may allow the user 108 to understand how addressing the one or more gaps 154 can help achieve their financial goals, such as staying within budget or increasing net worth-building cash flows.

With continued reference to FIG. 1, the projector 160, or any model herein, may be custom generated for a given user by analyzing their past financial data or incorporating their feedback to create a tailored and adaptive solution. Continuing, the custom model may recognize patterns in income, spending, savings, and investments, allowing it to categorize transactions and prioritize goals such as net worth-building cash flows. The custom model may dynamically adjust based on changes in the user's financial circumstances, such as salary increases or significant purchases. Feedback from the user may be integrated to refine the custom model further, enabling the user to specify preferences for transaction categorization or corrections to existing rules. The custom model may present interactive suggestions, such as resource reallocations, which the user may approve or modify to align with their financial goals. In a non-limiting example, the custom model may be designed to prioritize privacy and security. The custom model may store data locally or in a secure cloud instance that is only accessible to the user, ensuring that information is not shared broadly. To enhance security, the processing of data may occur within a sequestered environment, such as a virtual machine or secure enclave, isolating computations and preventing unauthorized access. Data encryption may also be utilized to protect the user's information both in transit and at rest. Without limitation, using projection tools the custom model may calculate resource allocation suggestions by analyzing gaps between the user's current financial status and their goals. For example, without limitation, the custom model may identify a shortfall in savings contributions and propose reallocating funds from surplus categories like discretionary spending. These suggestions may be displayed through an interactive graphical user interface, as described herein. Without limitation, the interactive graphical user interface may include visual aids such as color-coded charts or scenario analyses, which may help users understand the impact of proposed adjustments. Additionally and or alternatively, the custom model may provide predictive insights, such as forecasting future income or spending trends, to encourage proactive decision-making. In another non-limiting example, to ensure the custom model continues to meet the user's needs, it may incorporate a feedback loop, regularly updating itself based on new financial data and user interactions. A scalable framework may also allow the model to adapt to external factors, such as changes in tax laws or economic conditions. For instance, if a user consistently overspends in certain categories, the custom model may calculate a reallocation plan and present it with visual representations that demonstrate how the changes align with their budget or investment targets.

With continued reference to FIG. 1, wherein the projector 160 may include a second machine learning model 166, wherein the second machine learning model 166 may be iteratively trained on projector training dataset 168, wherein the projector training dataset 168 may comprise historical projection data 170 associated with historical allocation data 172. As used in this disclosure, a "projector training dataset" is a collection of data utilized to train the second machine learning model 166. In a non-limiting example, the projector training dataset 168 may include labeled or historical data that combines patterns, relationships, or dependencies between the projection data 162 and the allocation data. Without limitation, the projector training dataset 168 may be iteratively used to refine the ability of the second machine learning model 166 to calculate accurate and contextually relevant projections. For instance, without limitation, the projector training dataset 168 may include examples of how financial resources are projected to be allocated in past scenarios, paired with the actual or intended allocation data, to improve the predictive accuracy of the projector 160 over time. As used in this disclosure, "historical projection data" is past estimates or predictions generated by a system or model. The historical projection data 170 may include, but is not limited to, predicted budgets, forecasted cash flows, or estimated investment returns. Historical projection data 170 may serve as input for evaluating and training the second machine learning model 166, allowing the model to recognize trends, refine forecasting accuracy, and adapt to new patterns. For example, the historical projection data 170 in a financial context may include prior cash flow forecasts for specific periods. As used in this disclosure, "historical allocation data" is records or representations of how resources, values, or inputs were distributed or assigned in the past. Without limitation, the historical allocation data 172 may reflect actual or planned allocations across various categories, such as budgets, investments, or operational resources. Historical allocation data 172 may be used to provide context to historical projection data 170, enabling the second machine learning model 166 to assess the accuracy of prior projections and learn relationships between projected and actual allocations. For example, without limitation, the historical allocation data 172 may indicate how previously forecasted budgets were actually utilized across categories like savings, discretionary spending, and fixed expenses.

With continued reference to FIG. 1, wherein the projector 160 may be configured to calculate, using a sequestered data algorithm, the projection data 162 and generate the at least an allocation datum 164. As used in this disclosure, a "sequestered data algorithm" is a computational method used to process sensitive, protected, or isolated data within a secure framework. The algorithm may operate on sequestered data 110, such as confidential financial information, to calculate the projection data 162 and generate the at least an allocation datum 164. The sequestered data algorithm may include calculations such as, without limitation, reverse tax calculations and the analysis of bank balance data. Continuing, a reverse tax calculation may be used to determine a pre-tax amount based on a known after-tax amount and applicable tax rates. This method effectively reverses the standard tax calculation process, which adds taxes to a base amount to find a total. Instead, reverse tax calculations work backward to estimate the base amount before taxes were applied. The sequestered data algorithm may be designed to process sensitive data in a controlled and secure manner, ensuring confidentiality and preventing unauthorized access or exposure. In an embodiment, the sequestered data algorithm may include or leverage various technical algorithms to process financial data securely and efficiently. For predictive modeling, linear regression may be used to forecast cash flow trends, while gradient boosting methods, such as XGBoost or LightGBM, may refine these predictions by addressing complex, non-linear relationships in the data. Classification tasks may incorporate k-means clustering to group expenditures into categories like "lifestyle" or "net worth-building," or support vector machines (SVM) to identify risk levels or classify financial activities. For sequence-based modeling, Markov chains may predict future spending patterns, and recurrent neural networks (RNNs) may analyze time-series data for accurate projections. Probabilistic techniques such as Monte Carlo simulations may estimate potential outcomes for cash flow scenarios, while Bayesian inference may refine these predictions by incorporating prior knowledge or probabilities. Additionally and or alternatively, dimensionality reduction techniques like principal component analysis (PCA) may simplify large datasets for efficient analysis, and decision trees or random forests may aid in interpretable decision-making for classifying transactions or assessing risk. To enhance security, cryptographic hashing algorithms like SHA-256 may ensure data integrity, and homomorphic encryption may allow financial calculations on encrypted data without compromising privacy. Together, these technical algorithms may enable the sequestered data algorithm to deliver robust, secure, and actionable insights tailored to financial data processing and decision-making. The sequestered data algorithm may include components or routines for performing reverse tax calculations, which may involve determining pre-tax income or financial inflow based on after-tax figures. For instance, the sequestered data algorithm may use tax rates and deduction parameters to estimate the gross income required to achieve a given net balance. Additionally and or alternatively, the sequestered data algorithm may integrate bank balance data, leveraging historical and real-time account information to calculate accurate cash flow projections or recommend allocations.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2:
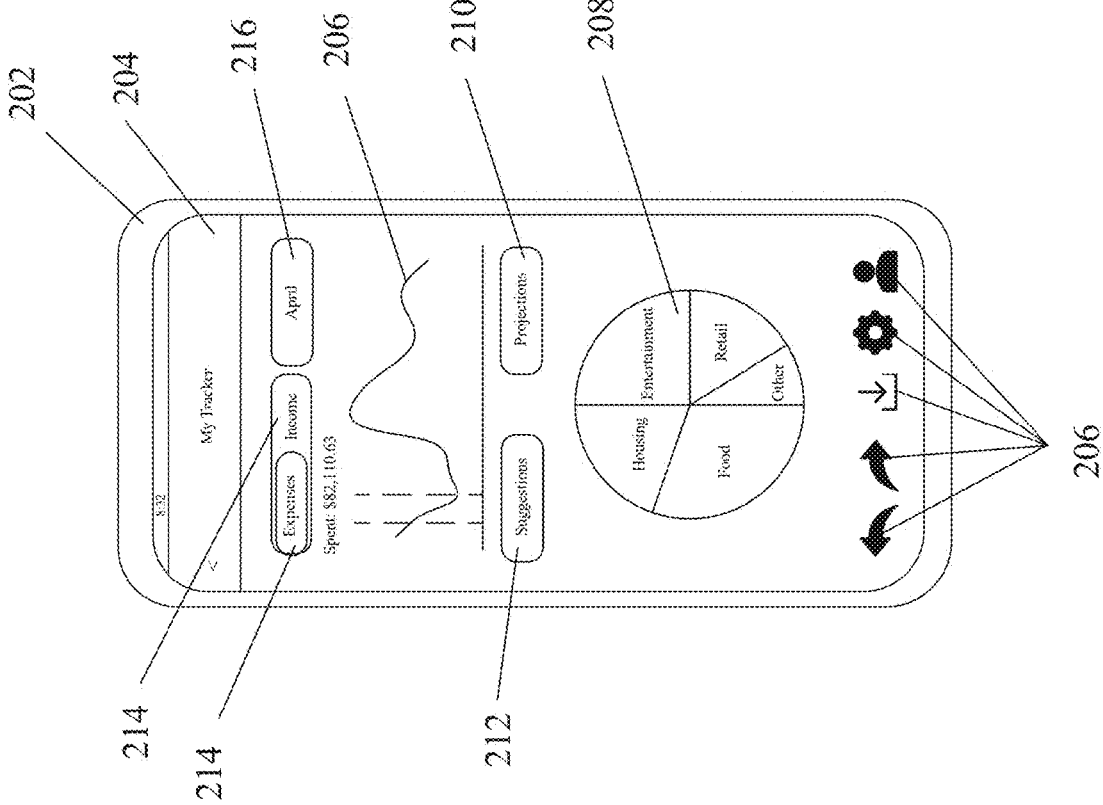
FIG. 2 is an illustration of a graphical user interface.

Referring now to FIG. 2, an illustration 200, of a graphical user interface. In an embodiment, the illustration 200 includes a display device 202. The display device 202 may include a graphical user interface 204 designed to allow user interaction and navigation through categorized financial information. In an embodiment, the illustration 200 includes a graphical user interface 204. In an embodiment, the illustration 200 includes a visual element 206. In an embodiment, the graphical user interface 204 may include visual elements 206 that provide an organized representation of expenses and income, offering a user-friendly layout for financial analysis.

In an embodiment, the illustration 200 includes a pie chart 208. As used in this disclosure, a "pie chart" is a circular statistical graphic divided into slices to illustrate proportional data. In an embodiment, the pie chart 208 may represent the distribution of expenses across different categories, such as housing, entertainment, or food, providing users with a clear view of spending patterns. In an embodiment, the graphical user interface 204 may include a pie chart 208, representing expenses distributed across various categories such as Entertainment, Food, Retail, Housing, and Other. The pie chart 208 may provide an intuitive visual summary of spending patterns for the specified time period. In an embodiment, the illustration 200 includes a projection view 210. As used in this disclosure, a "projection view" is a visual or data representation generated by predictive analytics, illustrating estimated future trends or outcomes based on historical or current data. In an embodiment, a projection view may forecast spending, income, or resource allocation for upcoming periods. In an embodiment, the graphical user interface 204 may also include a projection view 210, offering insights into predicted financial trends and future spending or income based on historical data. In an embodiment the projection view 210 may include projection data as described herein. In an embodiment, the illustration 200 includes suggestions 212. As used in this disclosure, "suggestions" are actionable recommendations or insights presented to a user to improve decision-making. Without limitation, the suggestions 212 may be generated by the evaluation model as described herein. In an embodiment, suggestions 212 may guide users toward optimizing spending habits, reallocating resources, or achieving financial goals based on analyzed data. In an embodiment, the graphical user interface 204 may include suggestions 212, which present actionable recommendations to optimize financial decisions, such as reallocating funds or adjusting spending habits. In an embodiment, the illustration 200 includes a toggle bar 214. As used in this disclosure, a "toggle bar" is an interactive graphical element within a user interface that allows users to switch between different views, options, or data sets. In an embodiment, the toggle bar 214 may enable users to switch views to look at expenses or income, such as inflow data and outflow data as described herein. In an embodiment, the illustration 200 includes a time-dependent view 216. In an embodiment, the graphical user interface 204 may include a time-dependent view 216, enabling users to analyze financial data for specific periods, such as a monthly view for April.

Figure 3:
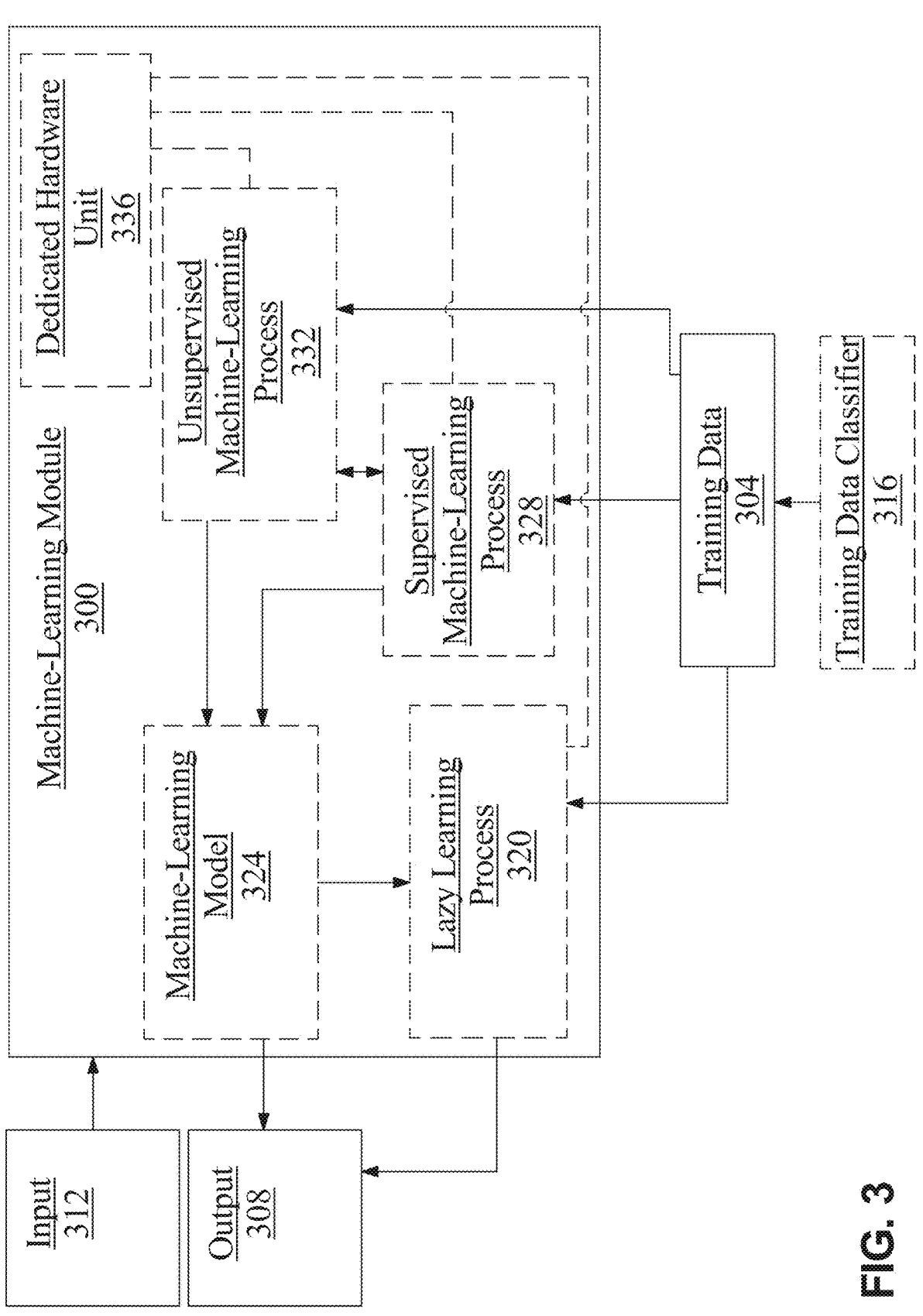
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs may include the plurality of input data, and outputs may include the dynamic data.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to inflow data and outflow data.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)$ $P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include plurality of input data as described above as inputs, dynamic data as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
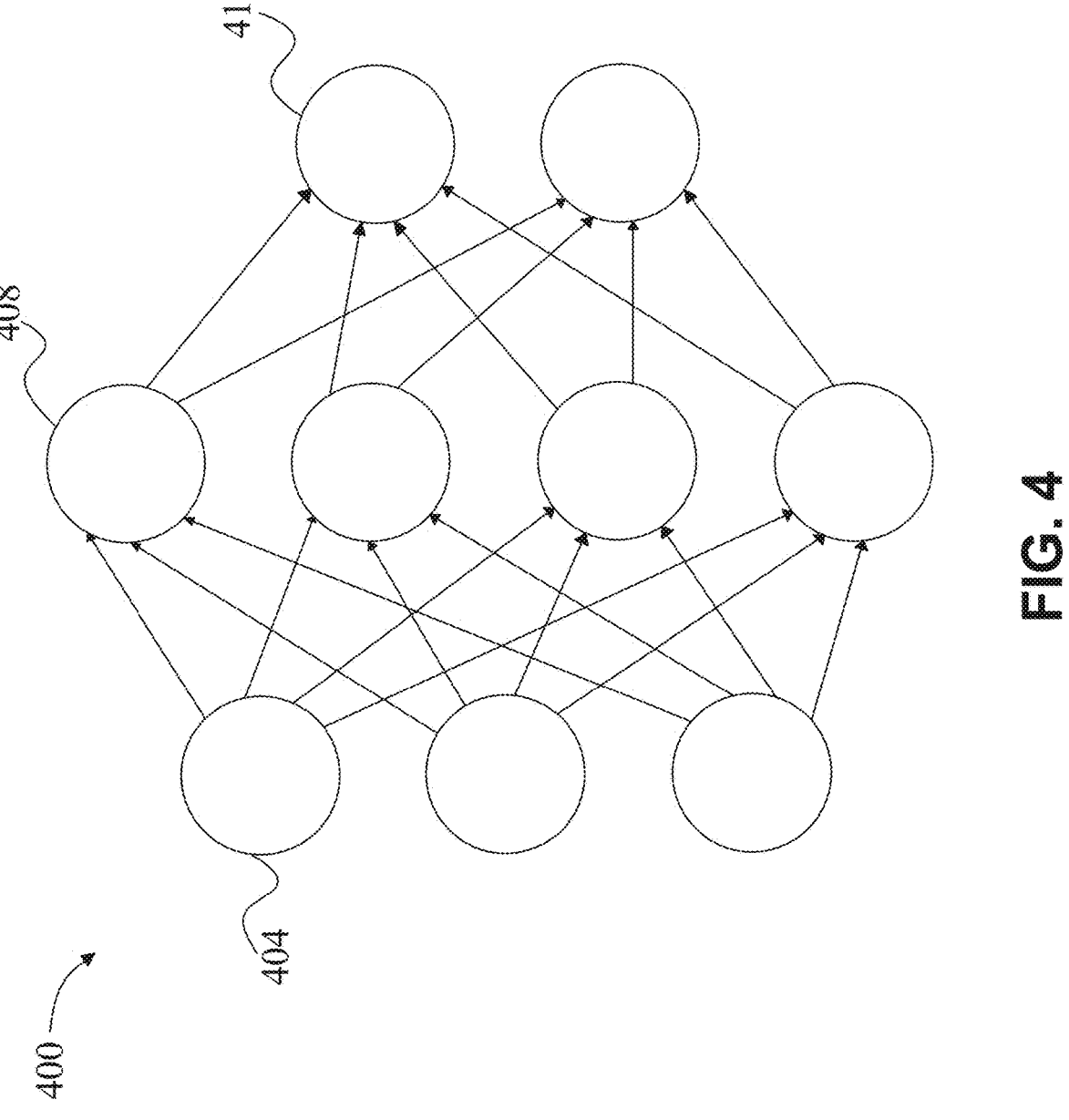
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
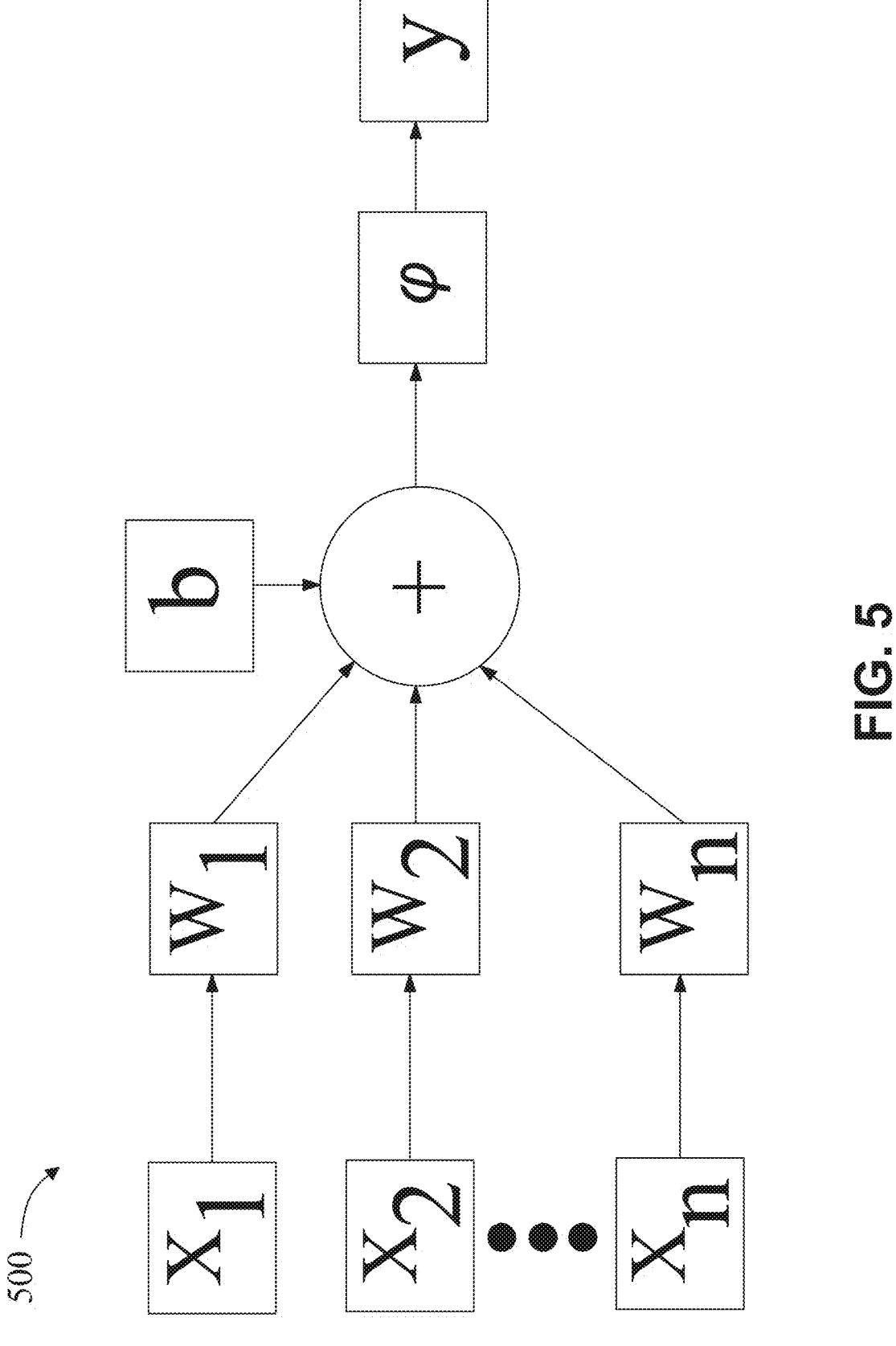
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x^*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
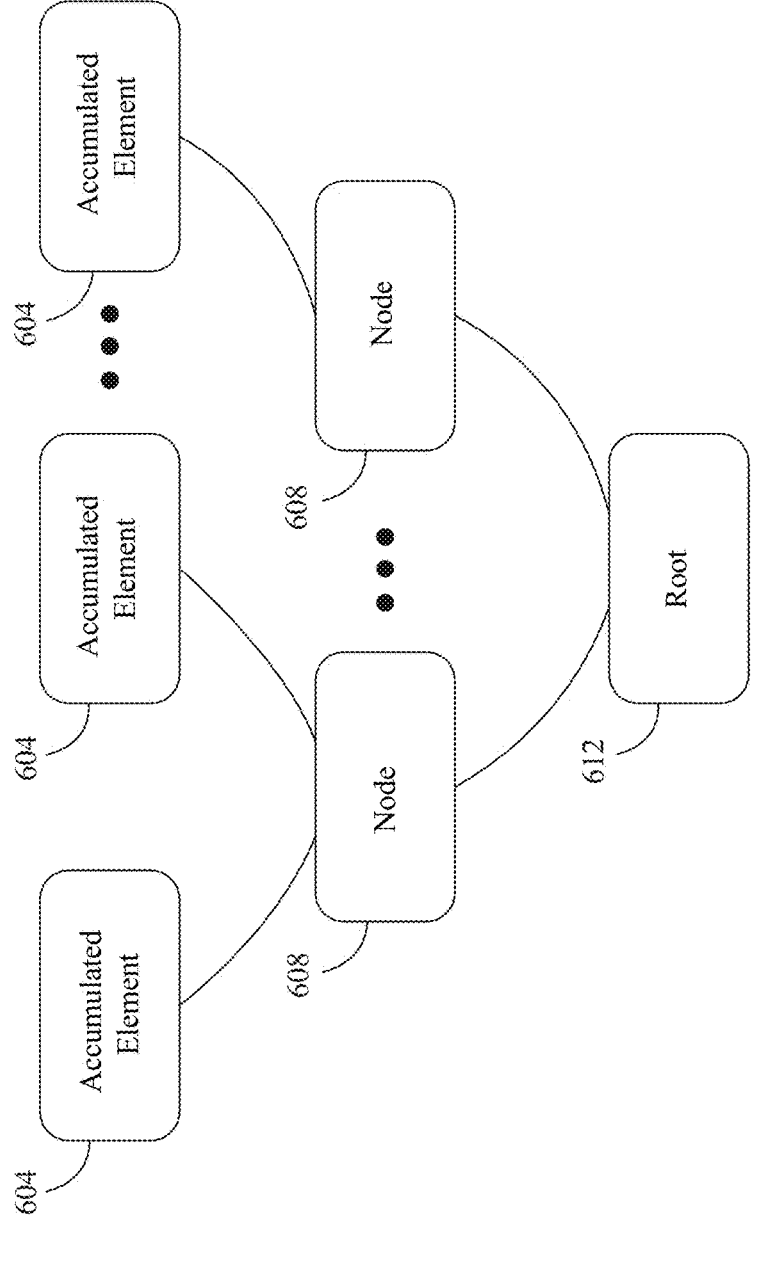
FIG. 6 is a diagram of an exemplary embodiment of a cryptographic accumulator.

Referring now to FIG. 6, an exemplary embodiment of a cryptographic accumulator 600 is illustrated. A "crypto-graphic accumulator," as used in this disclosure, is a data structure created by relating a commitment, which may be smaller amount of data that may be referred to as an "accumulator" and/or "root," to a set of elements, such as lots of data and/or collection of data, together with short membership and/or nonmembership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. Cryp-tographic accumulator 600 has a plurality of accumulated elements 604, each accumulated element 604 generated from a lot of the plurality of data lots. Accumulated elements 604 are created using an encryption process, defined for this purpose as a process that renders the lots of data unintelli-gible from the accumulated elements 604; this may be a one-way process such as a cryptographic hashing process and/or a reversible process such as encryption. Crypto-graphic accumulator 600 further includes structures and/or processes for conversion of accumulated elements 604 to root 612 element. For instance, and as illustrated for exem-plary purposes in FIG. 6 cryptographic accumulator 600 may be implemented as a Merkle tree and/or hash tree, in which each accumulated element 604 created by crypto-graphically hashing a lot of data. Two or more accumulated elements 604 may be hashed together in a further crypto-graphic hashing process to produce a node 608 element; a plurality of node 608 elements may be hashed together to form parent nodes 608, and ultimately a set of nodes 608 may be combined and cryptographically hashed to form root 612. Contents of root 612 may thus be determined by contents of nodes 608 used to generate root 612, and consequently by contents of accumulated elements 604, which are determined by contents of lots used to generate accumulated elements 604. As a result of collision resistance and avalanche effects of hashing algorithms, any change in any lot, accumulated element 604, and/or node 608 is virtually certain to cause a change in root 612; thus, it may be computationally infeasible to modify any element of Merkle and/or hash tree without the modification being detectable as generating a different root 612. In an embodi-ment, any accumulated element 604 and/or all intervening nodes 608 between accumulated element 604 and root 612 may be made available without revealing anything about a lot of data used to generate accumulated element 604; lot of data may be kept secret and/or demonstrated with a secure proof as described below, preventing any unauthorized party from acquiring data in lot.

Alternatively or additionally, and still referring to FIG. 6, cryptographic accumulator 600 may include a "vector com-mitment" which may act as an accumulator in which an order of elements in set is preserved in its root 612 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). Persons skilled in the art, upon reviewing the entirety of this disclosure, will be aware of various alternative or additional cryptographic accumulators 600 that may be used as described herein. In addition to Merkle trees, accumulators may include without limitation RSA accumulators, class group accumulators, and/or bi-linear pairing-based accumulators. Any accumu-lator may operate using one-way functions that are easy to verify but infeasible to reverse, i.e., given an input it is easy to produce an output of the one-way function but given an output it is computationally infeasible and/or impossible to generate the input that produces the output via the one-way function. For instance, and by way of illustration, a Merkle tree may be based on a hash function as described above. Data elements may be hashed and grouped together. Then, the hashes of those groups may be hashed again and grouped together with the hashes of other groups; this hashing and grouping may continue until only a single hash remains. As a further non-limiting example, RSA and class group accu-mulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Figure 7:
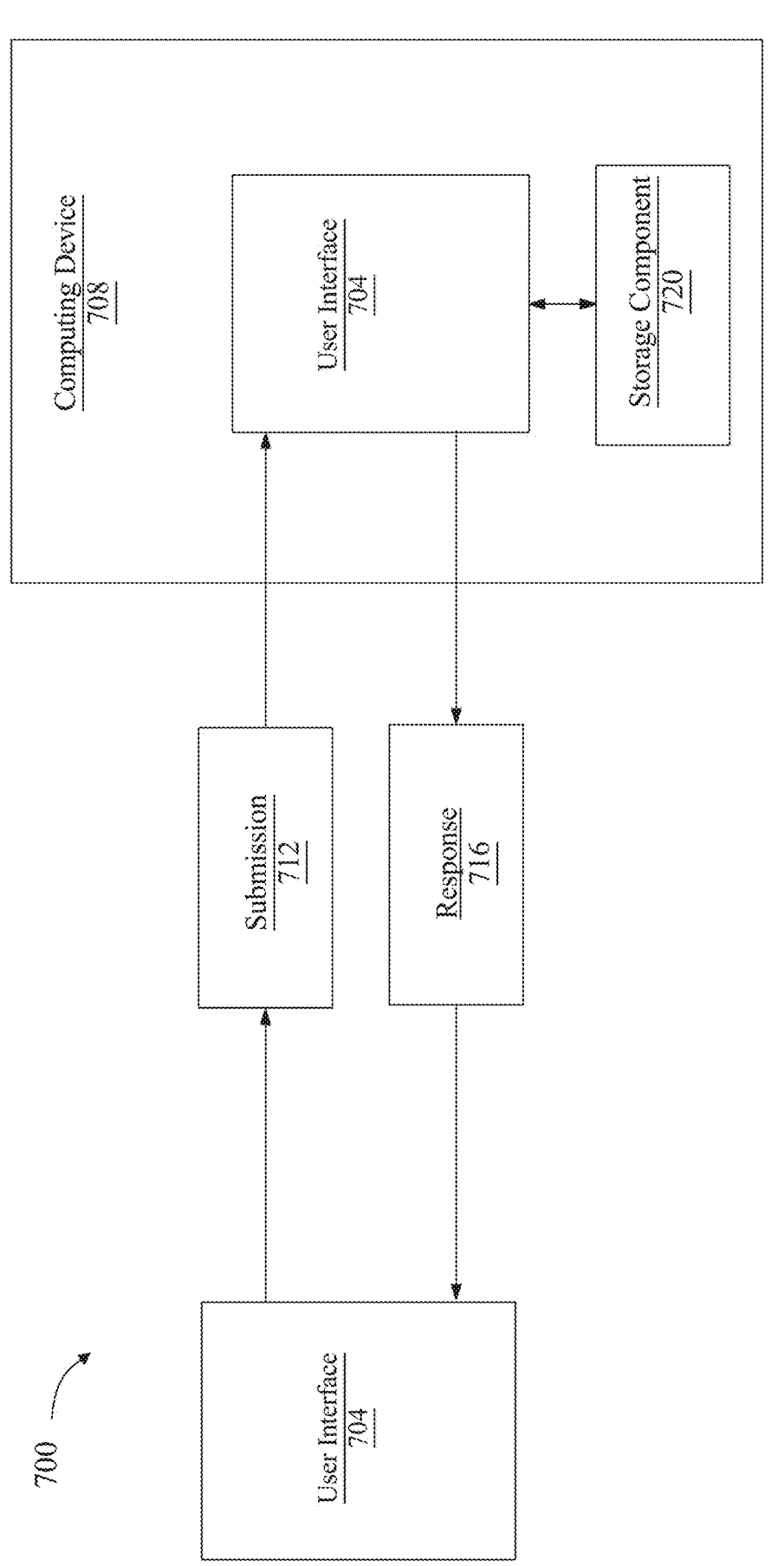
FIG. 7 is a diagram of an exemplary embodiment of a chatbot.

Referring to FIG. 7, a chatbot system 700 is schematically illustrated. According to some embodiments, a user interface 704 may be communicative with a computing device 708 that is configured to operate a chatbot. In some cases, user interface 704 may be local to computing device 708. Alternatively or additionally, in some cases, user interface 704 may remote to computing device 708 and communicative with the computing device 708, by way of one or more networks, such as without limitation the internet. Alternatively or additionally, user interface 704 may communicate with computing device 708 using telephonic devices and networks, such as without limitation fax machines, short message service (SMS), or multimedia message service (MMS). Commonly, user interface 704 communicates with computing device 708 using text-based communication, for example without limitation using a character encoding protocol, such as American Standard for Information Interchange (ASCII). Typically, a user interface 704 conversationally interfaces a chatbot, by way of at least a submission 712, from the user interface 704 to the chatbot, and a response 716, from the chatbot to the user interface 704. In many cases, one or both submission 712 and response 716 are text-based communication. Alternatively or additionally, in some cases, one or both of submission 712 and response 716 are audio-based communication.

Continuing in reference to FIG. 7, a submission 712 once received by computing device 708 operating a chatbot, may be processed by a processor. In some embodiments, processor processes submission 712 using one or more of keyword recognition, pattern matching, and natural language processing. In some embodiments, processor employs real-time learning with evolutionary algorithms. In some cases, processor may retrieve a pre-prepared response from at least a storage component 720, based upon submission 712. Alternatively or additionally, in some embodiments, processor communicates a response 716 without first receiving a submission 712, thereby initiating conversation. In some cases, processor communicates an inquiry to user interface 704; and the processor is configured to process an answer to the inquiry in a following submission 712 from the user interface 704. In some cases, an answer to an inquiry present within submission 712 from a user interface 704 may be used by computing device as an input to another function.

Referring now to FIG. 8, a flow diagram of an exemplary method 800 for determining dynamic data is illustrated. At step 805, method 800 includes receiving, using at least a processor, a plurality of input data associated with a user, wherein the input data comprises sequestered data and non-sequestered data. This may be implemented as described and with reference to FIGS. 1-7.

Still referring to FIG. 8, at step 810, method 800 includes generating, using a classifier, categorized data as a function of the plurality of input data, wherein the plurality of input data comprises inflow data and outflow data, the classifier further configured to determine an inflow pattern of the inflow data and an outflow pattern of the outflow data. This may be implemented as described and with reference to FIGS. 1-7.

Still referring to FIG. 8, at step 815, method 800 includes identifying, using an evaluation model, at least a status indicator as a function of the inflow data and the outflow data. This may be implemented as described and with reference to FIGS. 1-7.

Still referring to FIG. 8, at step 820, method 800 includes determining, using the at least a processor, dynamic data as a function of the categorized data and the at least a status indicator. This may be implemented as described and with reference to FIGS. 1-7.

Still referring to FIG. 8, at step 825, method 800 includes displaying, using a downstream device, the dynamic data. This may be implemented as described and with reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
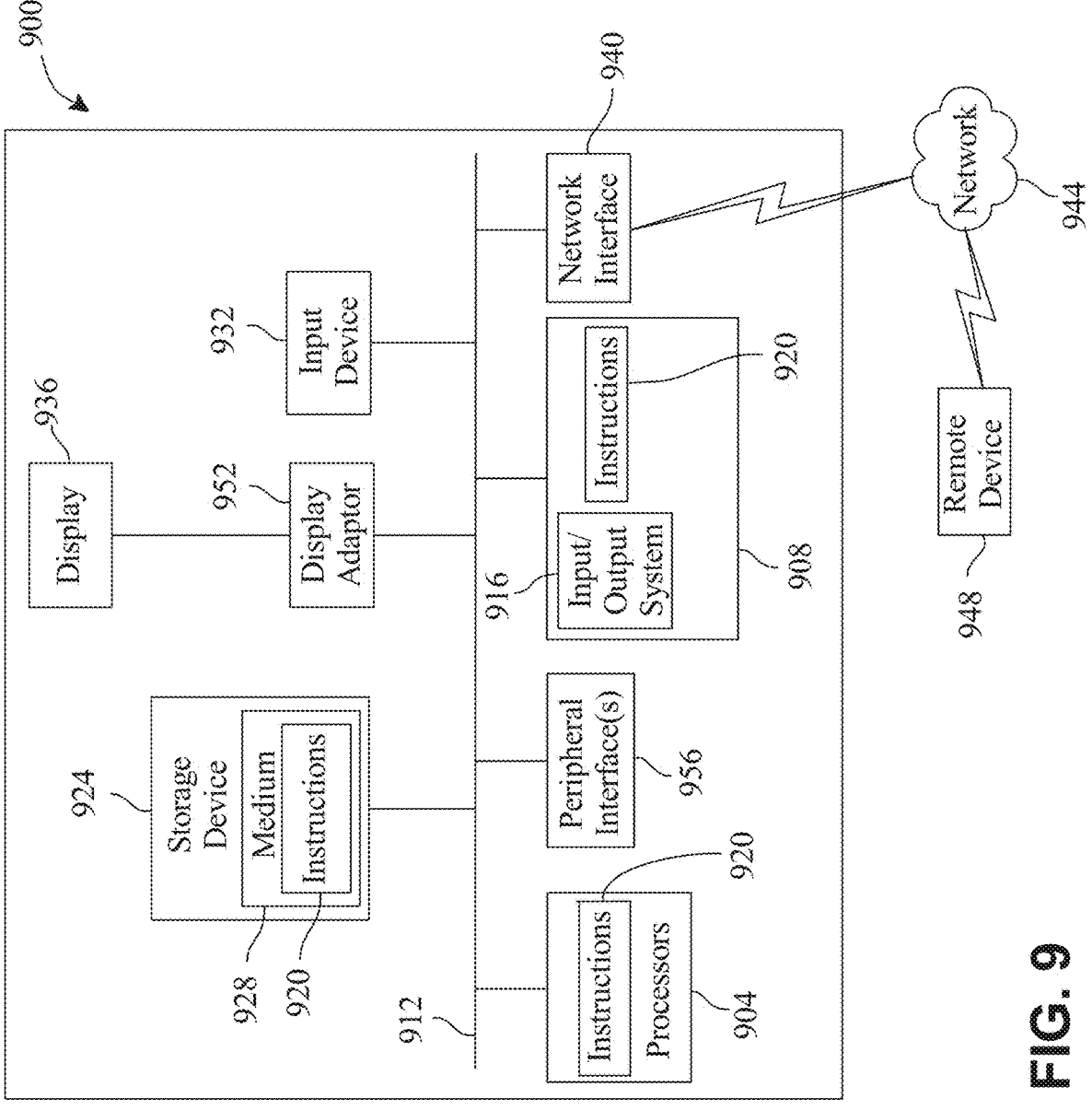
FIG. 9 is a block diagram of a computing system that can be used to implement any one or more of the methodologies disclosed herein and any one or more portions thereof.

FIG. 9 shows a diagrammatic representation of one embodiment of computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIRE-WIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for determining dynamic data, wherein the apparatus comprises:
    at least a computing device, wherein the computing device comprises:
        a memory; and
        at least a processor communicatively connected to the memory, wherein the memory contains instructions configuring the at least a processor to:
            receive, using the at least a processor, a plurality of input data associated with a user, wherein the input data comprises sequestered data and non-sequestered data;
            generate, using a classifier comprising a first machine learning model, categorized data as a function of the plurality of input data, wherein the categorized data comprises inflow data and outflow data, the classifier further configured to determine an inflow pattern of the inflow data and an outflow pattern of the outflow data;
            identify, using an evaluation model, at least a status indicator as a function of the inflow data and the outflow data;
            determine, using the at least a processor, dynamic data as a function of the categorized data and the at least a status indicator; and
            generate projection data using a projector comprising a second machine learning model and the evaluation model, wherein the projection data comprises at least an allocation datum, and further comprises:
                receiving projector training data, wherein the projector training data correlates a plurality of historical projection data to a plurality of historical allocation data;
                training, iteratively, the second machine learning model using the projector training data, wherein training the second machine learning model includes retraining the second machine learning model with feedback from previous iterations of the second machine learning model; and;
                determining projection data using the trained second machine learning model;
            display, using a downstream device the dynamic data and projection data for a reliable projection, as a function of the iteratively trained second machine learning model utilizing historical data.

2. The apparatus of claim 1, wherein the at least a processor is further configured to operate a chatbot and a large language model, wherein:
    the chatbot is configured to respond to an inquiry datum; and
    the large language model is configured to:
        receive the plurality of input data; and
        process the plurality of input data from unstructured data to structured data.

3. The apparatus of claim 1, wherein the plurality of input data comprises user credentials associated with an external sequestered repository.

4. The apparatus of claim 3, wherein the at least a processor is configured to:
    access, using the user credentials, the external sequestered repository; and
    retrieve, from the external sequestered repository, the sequestered data.

5. The apparatus of claim 1, wherein the classifier comprises a first machine learning model, wherein the first machine learning model is iteratively trained on classifier training dataset, wherein the classifier training dataset comprises historical flow data corresponding to historical status indicators.

6. The apparatus of claim 1, wherein the at least a processor is configured to generate projection data using a projector and the evaluation model, wherein the projection data comprises at least an allocation datum.

7. The apparatus of claim 6, wherein the projector comprises a second machine learning model, wherein the second machine learning model is iteratively trained on projector training dataset, wherein the projector training dataset comprises historical projection data associated with historical allocation data.

8. The apparatus of claim 6, wherein the projector is configured to:
    calculate, using a sequestered data algorithm, the projection data; and
    generate the at least an allocation datum.

9. The apparatus of claim 1, wherein the evaluation model determines the at least a status indicator by comparing the inflow data and the outflow data to at least a target datum.

10. The apparatus of claim 9, wherein the evaluation model identifies one or more gaps as a function of the at least a status indicator and the at least a target datum.

11. A method for determining dynamic data, wherein the method comprises:
    receiving, using at least a processor, a plurality of input data associated with a user, wherein the input data comprises sequestered data and non-sequestered data;
    generating, using a classifier, categorized data as a function of the plurality of input data, wherein the categorized data comprises inflow data and outflow data, the classifier further configured to determine an inflow pattern of the inflow data and an outflow pattern of the outflow data;
    identifying, using an evaluation model, at least a status indicator as a function of the inflow data and the outflow data;
    determining, using the at least a processor, dynamic data as a function of the categorized data and the at least a status indicator; and
    generating, using the at least a processor, projection data using a projector comprising a second machine learning model and the evaluation model, wherein the projection data comprises at least an allocation datum, and further comprises:
        receiving projector training data, wherein the projector training data correlates a plurality of historical projection data to a plurality of historical allocation data;
        training, iteratively, the second machine learning model using the projector training data, wherein training the second machine learning model includes retraining the second machine learning model with feedback from previous iterations of the second machine learning model; and;

determining projection data using the trained second machine learning model;

displaying, using a downstream device, the dynamic data and projection data for a reliable projection, as a function of the iteratively trained second machine learning model utilizing historical data.

12. The method of claim 11, wherein the at least a processor is further configured to operate a chatbot and a large language model, wherein:

the chatbot is configured to respond to an inquiry datum; and the large language model is configured to:

receive the plurality of input data; and process the plurality of input data from unstructured data to structured data.

13. The method of claim 11, wherein the plurality of input data comprises user credentials associated with an external sequestered repository.

14. The method of claim 13, wherein the at least a processor is configured to:

access, using the user credentials, the external sequestered repository; and retrieve, from the external sequestered repository, the sequestered data.

15. The method of claim 11, wherein the classifier comprises a first machine learning model, wherein the first machine learning model is iteratively trained on classifier training dataset, wherein the classifier training dataset comprises historical flow data corresponding to historical status indicators.

16. The method of claim 11, wherein the at least a processor is configured to generate projection data using a projector and the evaluation model, wherein the projection data comprises at least an allocation datum.

17. The method of claim 16, wherein the projector comprises a second machine learning model, wherein the second machine learning model is iteratively trained on projector training dataset, wherein the projector training dataset comprises historical projection data associated with historical allocation data.

18. The method of claim 16, wherein the projector is configured to:

calculate, using a sequestered data algorithm, the projection data; and generate the at least an allocation datum.

19. The method of claim 11, wherein the evaluation model determines the at least a status indicator by comparing the inflow data and the outflow data to at least a target datum.

20. The method of claim 19, wherein the evaluation model identifies one or more gaps as a function of the at least a status indicator and the at least a target datum.

\* \* \* \* \*